United States Patent
Nakao et al.

(10) Patent No.: US 11,693,130 B2
(45) Date of Patent: Jul. 4, 2023

(54) RADIATION DETECTION DEVICE

(71) Applicant: HAMAMATSU PHOTONICS K.K., Hamamatsu (JP)

(72) Inventors: Keisuke Nakao, Hamamatsu (JP); Kazuhisa Miyaguchi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 17/748,289

(22) Filed: May 19, 2022

(65) Prior Publication Data
US 2022/0276396 A1      Sep. 1, 2022

Related U.S. Application Data (63) Continuation of application No. 17/164,232, filed on Feb. 1, 2021, now Pat. No. 11,397,267.

(30) Foreign Application Priority Data

Feb. 3, 2020   (JP) .................... 2020-016128

(51) Int. Cl.
   *G01T 1/20*   (2006.01)
(52) U.S. Cl.
   CPC .......... *G01T 1/2002* (2013.01); *G01T 1/2006* (2013.01)
(58) Field of Classification Search
   CPC ......................... G01T 1/2002; G01T 1/2006
   See application file for complete search history.

(56) References Cited

U.S. PATENT DOCUMENTS

| 4,947,412 A | 8/1990 | Mattson |
| 6,479,827 B1 * | 11/2002 | Hamamoto ....... H01L 31/02322 |
| | | 348/E5.028 |
| 2016/0245933 A1 | 8/2016 | Van Arendonk |
| 2020/0200923 A1 | 6/2020 | Nishihara et al. |

FOREIGN PATENT DOCUMENTS

| EP | 0 666 483 A2 | 8/1995 |
| EP | 2 034 335 A1 | 3/2009 |
| JP | 2001-042042 A | 2/2001 |
| JP | 2004-085456 A | 3/2004 |

* cited by examiner

*Primary Examiner* — Hugh Maupin
(74) *Attorney, Agent, or Firm* — Faegre Drinker Biddle & Reath LLP (57) ABSTRACT

A radiation detection device includes a circuit board, a light receiving sensor having a light receiving region and a plurality of circuit regions, an FOP, a scintillator layer, and a plurality of wires. The FOP includes a first portion facing the light receiving region and fixed to the light receiving sensor, a second portion facing the circuit region while separated from the light receiving sensor, and a second portion facing the circuit region while separated from the light receiving sensor. The second portions are integrally formed with the first portion. One end of the wire is connected to the circuit region in a region between the light receiving sensor and the second portion, and one end of the wire is connected to the circuit region in a region between the light receiving sensor and the second portion.

13 Claims, 5 Drawing Sheets

RADIATION DETECTION DEVICE

TECHNICAL FIELD

The present disclosure relates to a radiation detection device.

BACKGROUND

A radiation detection device that includes a circuit board, a light receiving sensor provided on the circuit board, a fiber optic plate provided on a light receiving region of the light receiving sensor, a scintillator layer provided on the fiber optic plate, and a shielding member disposed to face a circuit region of the light receiving sensor while separated from the light receiving sensor is known (see, for example, Japanese Unexamined Patent Publication No. 2001-42042). In such a radiation detection device, since the shielding member suppresses the incidence of radiation on the circuit region, the deterioration of the light receiving sensor due to the deterioration of the circuit region can be suppressed.

SUMMARY

In a radiation detection device such as that described above, to prevent the shielding member from shielding radiation incident on the scintillator layer, the shielding member may be disposed in contact with a side surface of the fiber optic plate. However, in such a case, if the shielding member is not positioned with high accuracy with respect to the fiber optic plate, a gap may be formed between the fiber optic plate and the shield member, and radiation may be incident on the circuit region via the gap. Particularly, in radiation detection devices used for industrial non-destructive inspection, since an intensity of emitted radiation is high, even if the shielding member is positioned with high accuracy in contact with the side surface of the fiber optic plate, radiation may be incident on the circuit region via a space between the fiber optic plate and the shielding member.

An object of the present disclosure is to provide a radiation detection device capable of suppressing the deterioration of a light receiving sensor due to the incidence of radiation on a circuit region.

A radiation detection device according to an aspect of the present disclosure includes a circuit board; a light receiving sensor provided on the circuit board and having a light receiving region and a circuit region; a fiber optic plate provided on the light receiving sensor; a scintillator layer provided on the fiber optic plate; and a wire laid across the circuit region and the circuit board, wherein the fiber optic plate includes a first portion facing the light receiving region and fixed to the light receiving sensor, and a second portion facing the circuit region while separated from the light receiving sensor, second portion integrally formed with the first portion, and wherein one end of the wire is connected to the circuit region in a region between the light receiving sensor and the second portion.

DETAILED DESCRIPTION

Hereinafter, an embodiment of the present disclosure will be described in detail with reference to the drawings. In the drawings, the same or corresponding components will be denoted by the same reference signs and redundant description will be omitted.

Configuration of Radiation Detection Device

Figure 1:
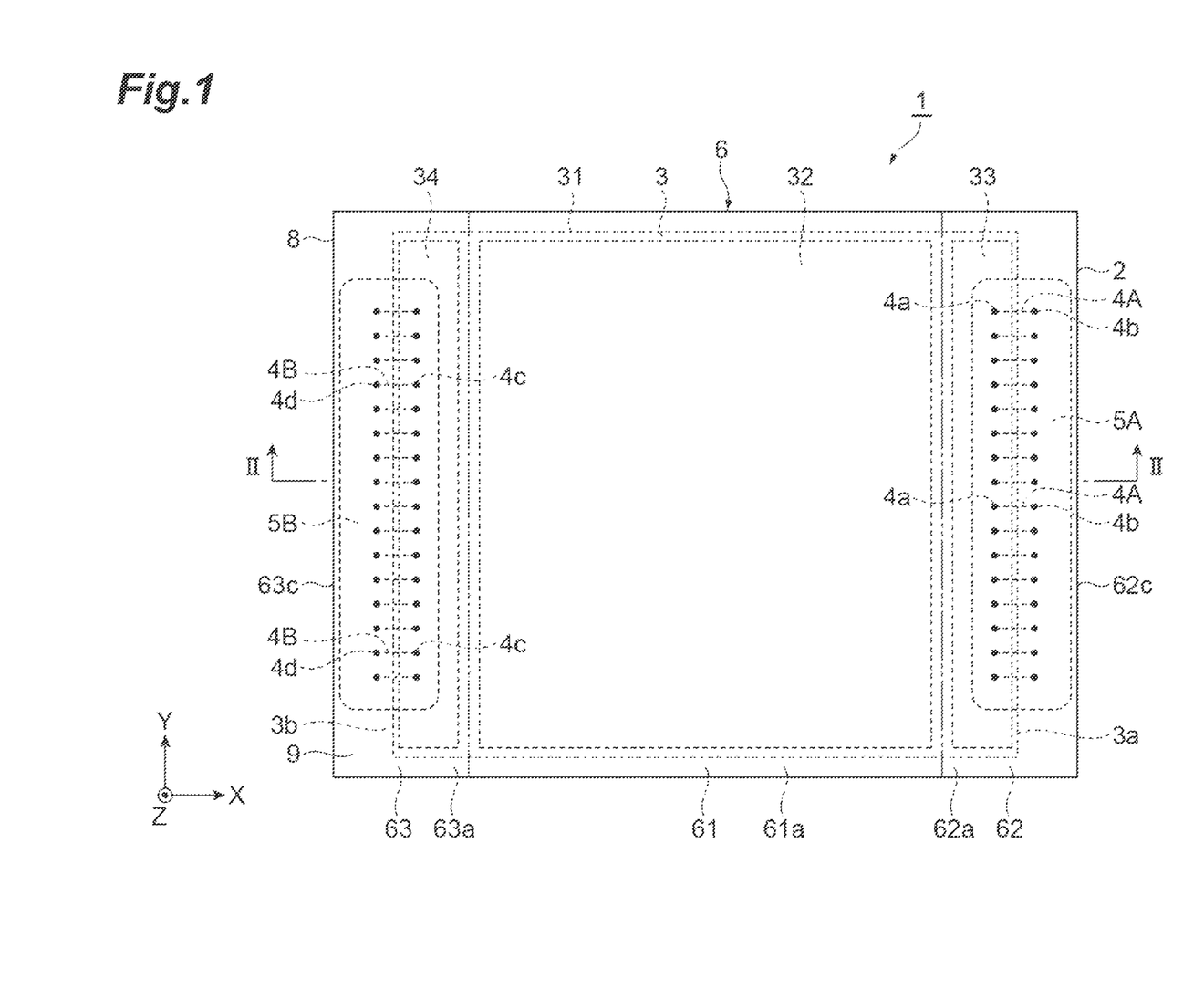
FIG. 1 is a plan view of a radiation detection device of an embodiment.
Figure 2:
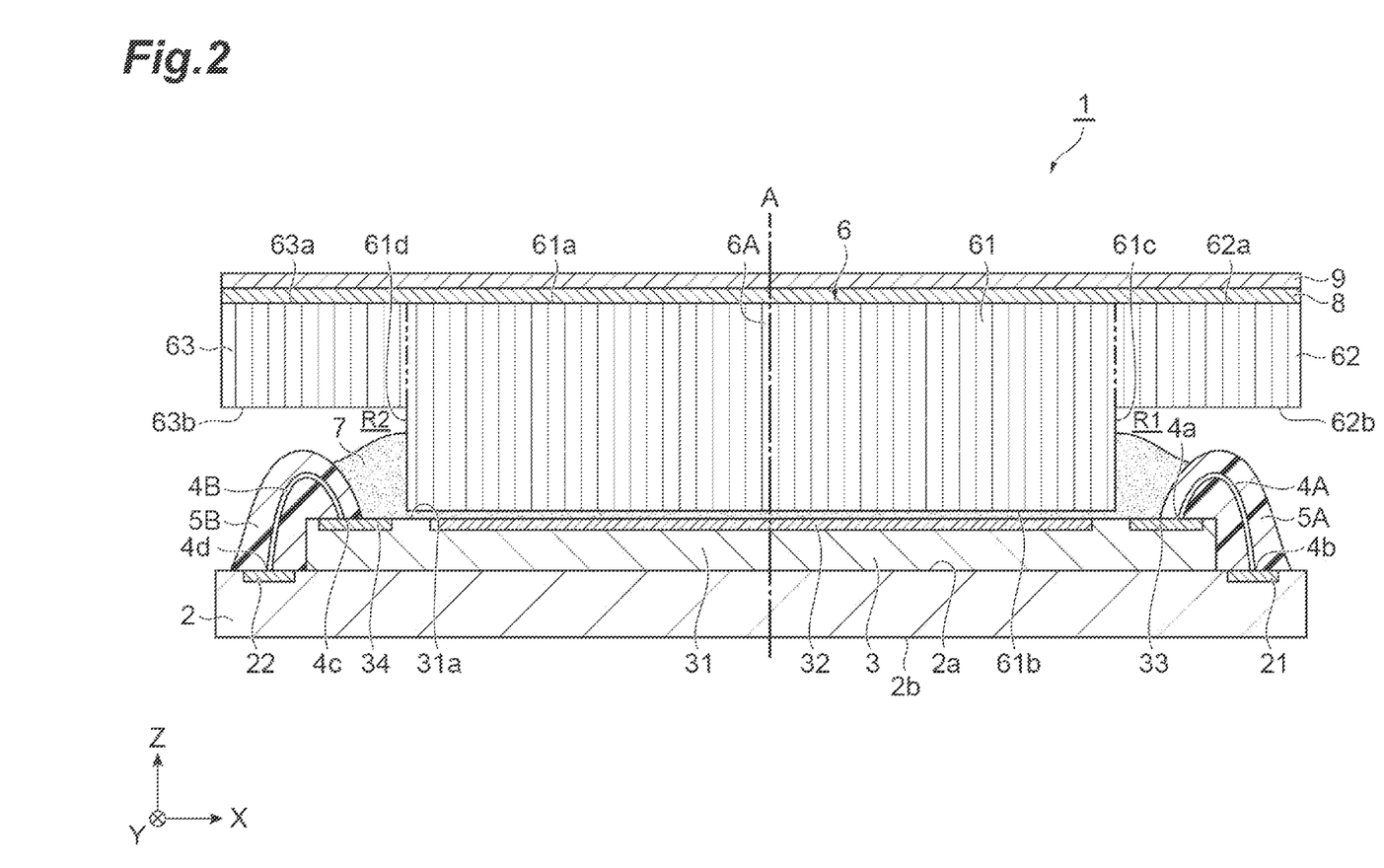
FIG. 2 is a cross-sectional view along line II-II shown in FIG. 1.

As shown in FIGS. 1 and 2, the radiation detection device 1 includes a circuit board 2, a light receiving sensor 3, a plurality of wires 4A and 4B, a plurality of protective members 5A and 5B, a fiber optic plate (FOP) 6, an adhesive member 7, a scintillator layer 8, and a metal layer 9. The radiation detection device 1 is a device that detects radiation emitted from a radiation source and transmitted through an object to be inspected and is used, for example, for industrial non-destructive inspection. Radiation is, for example, X-rays, gamma rays, and the like. The circuit board 2 has a surface 2a and a surface 2b that oppose each other in a thickness direction of the circuit board 2. Hereinafter, in the description of each configuration element, a direction parallel to the surface 2a and the surface 2b is referred to as an X-axis direction, a direction parallel to the surface 2a and the surface 2b and perpendicular to the X-axis direction is referred to as a Y-axis direction, and a direction in which the surface 2a and the surface 2b oppose each other is referred to as a Z-axis direction.

The circuit board 2 has, for example, a rectangular plate shape. The circuit board 2 has a plurality of terminals 21 and 22. In the circuit board 2, the terminals 21 and 22 are provided on the surface 2a side to be exposed to the outside. The circuit board 2 inputs and outputs an electric signal to and from the light receiving sensor 3 via the plurality of terminals 21 and 22. The plurality of terminals 21 and 22 are arranged along two sides of outer edge of the circuit board 2 opposing each other in the X-axis direction. Specifically, the plurality of terminals 21 are arranged along the side of one of the two sides in the X-axis direction, and the plurality of terminals 22 are arranged along the side of the other of the two sides in the X-axis direction. In FIG. 1, the plurality of terminals 21 and the plurality of terminals 22 are not shown.

The light receiving sensor 3 is provided on the circuit board 2. The light receiving sensor 3 is located between the plurality of terminals 21 and the plurality of terminals 22 when seen in the Z-axis direction. The light receiving sensor 3 has, for example, a rectangular plate shape. The light receiving sensor 3 has a semiconductor substrate 31. A light receiving region 32 and a plurality of circuit regions 33 and 34 are formed in the semiconductor substrate 31. The light receiving sensor 3 is a solid-state imaging element such as a CMOS. The light receiving region 32 is constituted by a plurality of pixels that perform photoelectric conversion. The plurality of pixels are arranged in a two-dimensional shape, for example. Each of the circuit regions 33 and 34 is a signal reading circuit such as a shift register.

The light receiving region 32 and the circuit regions 33 and 34 are formed, for example, in a portion of the semiconductor substrate 31 on a surface 31a side. The surface 31a is a surface of the semiconductor substrate 31 on a side opposite to the circuit board 2. The light receiving region 32 has, for example, a rectangular shape when seen in the Z-axis direction (the thickness direction of the circuit board 2). The circuit regions 33 and 34 are adjacent to the light receiving region 32 when seen in the Z-axis direction. In the present embodiment, the circuit regions 33 and 34 face each other with the light receiving region 32 interposed therebetween in the X-axis direction. The circuit region 33 is disposed on one side in the X-axis direction with respect to the light receiving region 32. The circuit region 34 is disposed on the other side in the X-axis direction with respect to the light receiving region 32.

The plurality of wires 4A are laid across the circuit region 33 and the circuit board 2. Specifically, the wires 4A are connected to the circuit region 33 at one ends 4a and are connected to the terminals 21 of the circuit board 2 at the other ends 4b. That is, each wire 4A electrically connects the circuit region 33 and one of the terminals 21 of the circuit board 2 to each other. The wires 4A are covered with the protective member 5A. The protective member 5A is formed of, for example, a resin.

The plurality of wires 4B are laid across the circuit region 34 and the circuit board 2. Specifically, the wires 4B are connected to the circuit region 34 at one ends 4c and are connected to the terminals 22 of the circuit board 2 at the other ends 4d. That is, each wire 4B electrically connects the circuit region 34 and one of the terminals 22 of the circuit board 2 to each other. The wires 4B are covered with the protective member 5B. The protective member 5B is formed of, for example, a resin.

The FOP 6 is provided on the light receiving sensor 3. The FOP 6 is an optical device constituted by a bundle of a plurality of optical fibers 6A. The FOP 6 is formed, for example, in a rectangular plate shape. Each optical fiber 6A extends to be able to guide light to the light receiving sensor 3. In the present embodiment, an optical axis A of each optical fiber 6A extends in the Z-axis direction.

The FOP 6 has a first portion 61 and a plurality of second portions 62 and 63. The first portion 61 includes a surface 61a and a surface 61b that oppose each other in the Z-axis direction. The surface 61a is a surface of the first portion 61 on a side opposite to the light receiving sensor 3 and is a surface on which light is incident. The surface 61b is a surface of the first portion 61 on the light receiving sensor 3 side and is an emitting surface of light. The first portion 61 faces the light receiving region 32. Specifically, the first portion 61 is fixed to the light receiving sensor 3 to cover the light receiving region 32. The first portion 61 is, for example, a rectangular parallelepiped portion.

The second portion 62 and the second portion 63 face each other with the first portion 61 interposed therebetween in the X-axis direction. The second portion 62 is disposed on one side in the X-axis direction with respect to the first portion 61. The second portion 63 is disposed on the other side in the X-axis direction with respect to the first portion 61. Each of the second portions 62 and 63 is, for example, a rectangular parallelepiped portion. The second portions 62 and 63 are integrally formed with the first portion 61.

The second portion 62 includes a surface 62a and a surface 62b that oppose each other in the Z-axis direction. The surface 62a is a surface of the second portion 62 on a side opposite to the light receiving sensor 3. The surface 62b is a surface of the second portion 62 on the light receiving sensor 3 side. The second portion 63 includes a surface 63a and a surface 63b that oppose each other in the Z-axis direction. The surface 63a is a surface of the second portion 63 on a side opposite to the light receiving sensor 3. The surface 63b is a surface of the second portion 63 on the light receiving sensor 3 side. The surface 61a of the first portion 61, the surface 62a of the second portion 62, and the surface 63a of the second portion 63 are located on the same plane.

The surface 61b of the first portion 61 is fixed to the surface 31a of the semiconductor substrate 31. The second portion 62 faces the circuit region 33 while separated from the light receiving sensor 3. The second portion 63 faces the circuit region 34 while separated from the light receiving sensor 3. The surface 62b of the second portion 62 is separated from the circuit region 33. Since the surface 62b and the circuit region 33 are separated from each other, a region R1 is defined between the light receiving sensor 3 and the second portion 62. Specifically, the region R1 is defined by the surface 31a of the light receiving sensor 3 on the second portion 62 side, the surface 62b of the second portion 62 on the light receiving sensor 3 side, and a side surface 61c of the first portion 61. The side surface 61c of the first portion 61 is a surface of the first portion 61 on the second portion 62 side. The one end 4a of each wire 4A is connected to the circuit region 33 in the region R1.

The surface 63b of the second portion 63 is separated from the circuit region 34. Since the surface 63b and the circuit region 34 are separated from each other, a region R2 is defined between the light receiving sensor 3 and the second portion 63. Specifically, the region R2 is defined by the surface 31a of the light receiving sensor 3 on the second portion 63 side, the surface 63b of the second portion 63 on the light receiving sensor 3 side, and a side surface 61d of the first portion 61. The side surface 61d of the first portion 61 is a surface of the first portion 61 on the second portion 63 side. The one end 4c of each wire 4B is connected to the circuit region 34 in the region R2.

When seen in the Z-axis direction, a portion 62c of outer edge of the second portion 62 on a side opposite to the first portion 61 is located outside a portion 3a of the light receiving sensor 3. The portion 3a is a portion of outer edge of the light receiving sensor 3 on the terminal 21 side (a side opposite to the first portion 61) with respect to the circuit region 33. In the present embodiment, the portion 62c is located outside the other end 4b of the wire 4A connected to the circuit board 2 when seen in the Z-axis direction. In other words, the second portion 62 includes the circuit region 33, the plurality of wires 4A, and the protective member 5A when seen in the Z-axis direction.

When seen in the Z-axis direction, a portion 63c of outer edge of the second portion 63 on a side opposite to the first portion 61 is located outside a portion 3b of the light receiving sensor 3. The portion 3b is a portion of outer edge of the light receiving sensor 3 on the terminal 22 side (a side opposite to the first portion 61) with respect to the circuit region 34. In the present embodiment, the portion 63c is located outside the other end 4d of the wire 4B connected to the circuit board 2 when seen in the Z-axis direction. In other words, the second portion 63 includes the circuit region 34, the plurality of wires 4B, and the protective member 5B when seen in the Z-axis direction.

The adhesive member 7 is disposed between the light receiving sensor 3 and the first portion 61. The light receiving sensor 3 and the FOP 6 adhere to each other with the adhesive member 7. The adhesive member 7 protrudes into the region R1 between the light receiving sensor 3 and the second portion 62 and the region R2 between the light receiving sensor 3 and the second portion 63. Specifically, the adhesive member 7 is in contact with the side surfaces 61c and 61d of the first portion 61. The adhesive member 7 is formed of, for example, a light-transmitting resin. In FIG. 1, the adhesive member 7 is not shown.

The scintillator layer 8 is provided on the FOP 6. The scintillator layer 8 emits light when light is incident thereon. The scintillator layer 8 is formed of, for example, CsI, GOS, or the like. The scintillator layer 8 is integrally formed across the surface 61a of the first portion 61, the surface 62a of the second portion 62, and the surface 63a of the second portion 63.

The metal layer 9 is provided on the scintillator layer 8. The metal layer 9 reflects the light generated in the scintillator layer 8 to prevent the light from traveling to a side opposite to the FOP 6. The metal layer is integrally formed across the surface 61a of the first portion 61, the surface 62a of the second portion 62, and the surface 63a of the second portion 63.

Operation and Effect

In the radiation detection device 1, the second portion 62 of the FOP 6 faces the circuit region 33 of the light receiving sensor 3 while separated from the light receiving sensor 3, and in a region between the light receiving sensor 3 and the second portion 62, the one end 4a of the wire 4A is connected to the circuit region 33. Further, the second portion 63 of the FOP 6 faces the circuit region 34 of the light receiving sensor 3 while separated from the light receiving sensor 3, and in a region between the light receiving sensor 3 and the second portion 63, the one end 4c of the wire 4B is connected to the circuit region 34. Accordingly, it is possible to suppress the incidence of radiation on each of the circuit regions 33 and 34 while sufficiently securing the region R1 in which the one end 4a of the wire 4A is connected to the circuit region 33 and the region R2 in which the one end 4c of the wire 4B is connected to the circuit region 34. In particular, since the second portions 62 and 63 are integrally formed with the first portion 61, a situation in which radiation is incident on the circuit region 33 via a space between the first portion 61 and the second portion 62 and a situation in which radiation is incident on the circuit region 34 via a space between the first portion 61 and the second portion 63 are prevented. Therefore, according to the radiation detection device 1, it is possible to suppress the deterioration of the light receiving sensor 3 due to the incidence of radiation on each of the circuit regions 33 and 34.

Further, in the radiation detection device 1, since the second portions 62 and 63 are integrally formed with the first portion 61, the number of components can be reduced and the cost can be reduced. Furthermore, in the radiation detection device 1, since the second portions 62 and 63 are integrally formed with the first portion 61, it is not necessary to align the second portions 62 and 63 with respect to the first portion 61, and thus it is possible to improve manufacturing efficiency.

An effect that the second portions 62 and 63 are integrally formed with the first portion 61 will be further described. For example, in a case in which the first portion 61 and the second portions 62 and 63 are separate bodies and the first portion 61 and the second portions 62 and 63 are adhered to each other by an adhesive member formed of a resin or the like, the following problem may occur. Radiation may be incident on the circuit region 33 via the adhered portion between the first portion 61 and the second portion 62, and radiation may be incident on the circuit region 34 via the adhered portion between the first portion 61 and the second portion 63. On the other hand, in the radiation detection device 1, since the FOP 6 is constituted by the integrally formed first portion 61 and the plurality of second portions 62 and 63, there is no concern of the incidence of radiation on each of the circuit regions 33 and 34 described above occurring, and the deterioration of the light receiving sensor 3 can be reliably suppressed.

Further, for example, in a case in which the FOP 6 is constituted by a plurality of components adjacent in the Z-axis direction, the following problem may occur. For example, it is assumed that the FOP 6 is constituted by a first member and a second member supported on the first member. The first member is a portion of the FOP 6 facing the light receiving region 32 on the light receiving sensor 3 side (a portion of the first portion 61 shown in FIG. 2 which is interposed between the region R1 and the region R2 in the X-axis direction). The second member includes a portion of the FOP 6 facing the circuit region 33 while separated from the circuit region 33 (a portion corresponding to the second portion 62), a portion of the FOP 6 facing the circuit region 34 while separated from the circuit region 34 (a portion corresponding to the second portion 63), and a portion facing the light receiving region 32 on the scintillator layer 8 side (a portion of the first portion 61 shown in FIG. 2 which is interposed between the second portion 62 and the second portion 63 in the X-axis direction). In that case, when the first member and the second member are adhered to each other by an adhesive member formed of a resin or the like, light emitted by the scintillator layer 8 may be diffused at the adhered portion between the first portion and the second portion, the appropriate incidence of light on the light receiving region 32 may be hindered, and resolution of an image acquired by the radiation detection device 1 may be reduced. On the other hand, in the radiation detection device 1, since the FOP 6 is constituted by the integrally formed first portion 61 and the plurality of second portions 62 and 63, there is no concern of the reduction of resolution of an image described above occurring, and the deterioration of the light receiving sensor 3 can be reliably suppressed.

Here, an effect exhibited by the radiation detection device 1 will be described in comparison with an example of a radiation detection device provided with a shielding member. As an example, the shielding member is disposed to face the circuit region of the light receiving sensor while separated from the light receiving sensor. For example, in a case in which assembly of the shielding member is performed in a state in which a position of the shielding member on the circuit region side slightly deviates to a side farther from the FOP in the X-axis direction and a gap is formed between the shielding member and the FOP, radiation may be incident on the circuit region via the gap. Further, for example, in a case in which the shielding member is located above the metal layer, the following problem may occur. For example, in a case in which assembly of the shielding member is performed in a state in which a position of the shielding member on the circuit region side slightly deviates to a side closer to the FOP in the X-axis direction and the circuit region and a part of the light receiving region face a part of the shielding member, the shielding member shields radiation incident on the scintillator layer, and thus an effective light receiving area of the light receiving region becomes small. According to the radiation detection device 1, since each of the second portions 62 and 63 of the FOP 6 has a shielding function, the deterioration of the light receiving sensor 3 can be suppressed while such a risk is avoided.

Further, in the radiation detection device 1, when seen in the thickness direction of the circuit board 2, the portion 62c of outer edge of the second portion 62 on the side opposite to the first portion 61 is located outside the portion 3a of outer edge of the light receiving sensor 3 on the side opposite to the first portion 61 with respect to the circuit region 33, and the portion 63c of outer edge of the second portion 63 on the side opposite to the first portion 61 is located outside the portion 3b of outer edge of the light receiving sensor 3 on the side opposite to the first portion 61 with respect to the circuit region 34. Accordingly, even if a position of the FOP 6 with respect to the light receiving sensor 3 slightly deviates, when seen in the thickness direction of the circuit board 2, a state in which the second portion 62 includes the circuit region 33 and a state in which the second portion 63 includes the circuit region 34 are easily maintained, and thus it is possible to reliably suppress the incidence of radiation on each of the circuit regions 33 and 34.

Further, in the radiation detection device 1, when seen in the thickness direction of the circuit board 2, the portion 62c of outer edge of the second portion 62 on the side opposite to the first portion 61 is located outside the other end 4b of the wire 4A connected to the circuit board 2, and the portion 63c of outer edge of the second portion 63 on the side opposite to the first portion 61 is located outside the other end 4d of the wire 4B connected to the circuit board 2. Accordingly, in the thickness direction of the circuit board 2, the second portion 62 covers the wire 4A and the second portion 63 covers the wire 4B, and thus damage to the wires 4A and 4B can be prevented.

Further, the radiation detection device 1 further includes the protective member 5A that covers the wire 4A and the protective member 5B that covers the wire 4B. In the protective member 5A, the incidence of radiation is blocked by the second portion 62, and in the protective member 5B, the incidence of radiation is blocked by the second portion 63, and thus the deterioration is suppressed. Therefore, damage to the wires 4A and 4B can be more reliably prevented.

Further, in the radiation detection device 1, the region R1 between the light receiving sensor 3 and the second portion 62 is defined by the surface 31a of the light receiving sensor 3 on the second portion 62 side, the surface 62b of the second portion 62 on the light receiving sensor 3 side, and the side surface 61c of the first portion 61. Specifically, the region R2 between the light receiving sensor 3 and the second portion 63 is defined by the surface 31a, the surface 63b of the second portion 63 on the light receiving sensor 3 side, and the side surface 61d of the first portion 61. Accordingly, it is possible to sufficiently secure the region R1 in which the one end 4a of the wire 4A is connected to the circuit region 33 and the region R2 in which the one end 4c of the wire 4B is connected to the circuit region 34, and it is possible to easily secure a portion of the second portion 62 in which the incidence of radiation on the circuit region 33 can be reliably suppressed and a portion of the second portion 63 in which the incidence of radiation on the circuit region 34 can be reliably suppressed.

Figure 3:
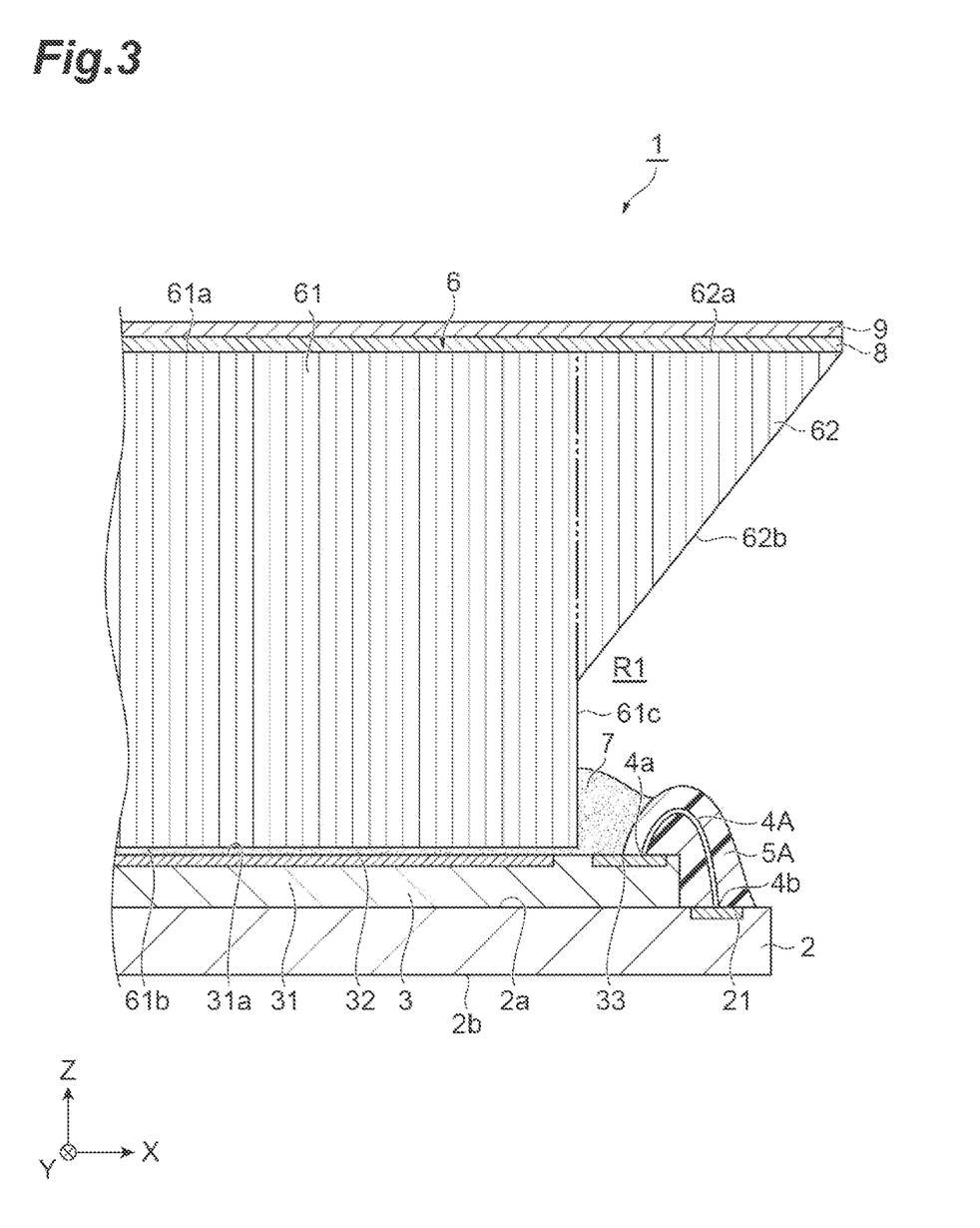
FIG. 3 is a cross-sectional view of a radiation detection device of a modification example.
Figure 4:
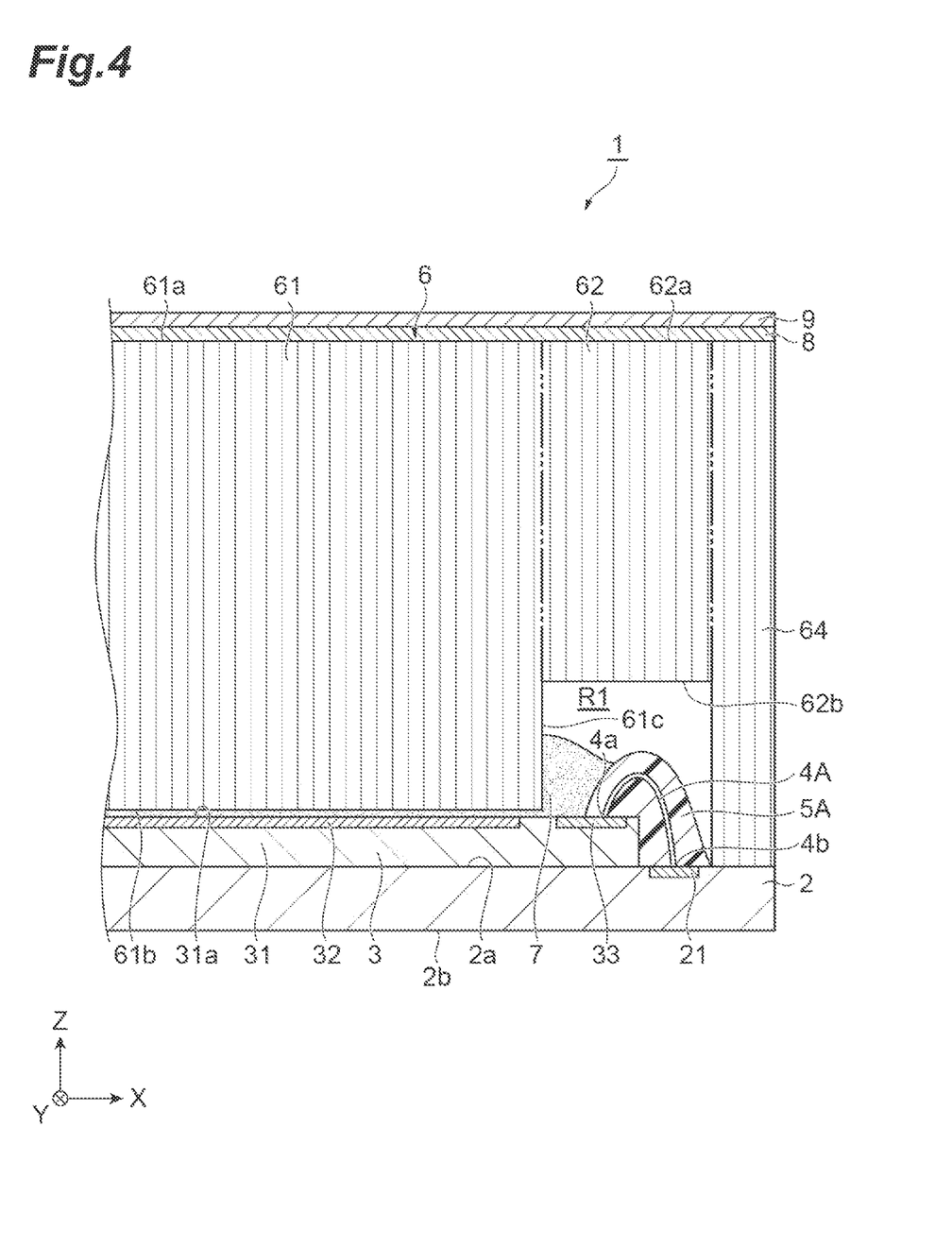
FIG. 4 is a cross-sectional view of a radiation detection device of a modification example.

Further, in the radiation detection device 1, the optical axis A of each optical fiber 6A constituting the FOP 6 extends in the thickness direction of the circuit board 2. Accordingly, the size of the FOP 6 can be reduced. Particularly, for example, in a case in which the FOP 6 is formed to have the side surface 61c in the first portion 61 (see FIGS. 2, 3 and 4), if the optical axis A of each optical fiber 6A is inclined toward the second portion 62 side with respect to the thickness direction of the circuit board 2, no light is incident on each optical fiber 6A constituting the side surface 61c at an end opposite to the light receiving sensor 3. That is, a portion in one end of the first portion 61 corresponding to each optical fiber 6A constituting the side surface 61c of the first portion 61 (a lower right portion of the first portion 61 shown in FIGS. 2, 3, and 4) does not have a light propagation function, and, when the FOP 6 has a useless portion that does not have such a light propagation function, the FOP 6 becomes large. In the radiation detection device 1, there is no such a useless portion, and each optical fiber 6A propagates light to the light receiving region 32, and thus the size of the FOP 6 can be reduced.

Further, in the radiation detection device 1, the adhesive member 7 disposed between the light receiving sensor 3 and the first portion 61 protrudes into the region R1 between the light receiving sensor 3 and the second portion 62 and the region R2 between the light receiving sensor 3 and the second portion 63. Accordingly, the adhesive strength between the FOP 6 and the light receiving sensor 3 can be improved. In particular, since the adhesive member 7 is in contact with the side surfaces 61c and 61d of the first portion 61, the adhesive strength between the FOP 6 and the light receiving sensor 3 can be further improved.

Further, in the radiation detection device 1, the surface 61a of the first portion 61, the surface 62a of the second portion 62, and the surface 63a of the second portion 63 are located on the same plane, and the scintillator layer 8 is integrally formed across the surface 61a, the surface 62a, and the surface 63a. Accordingly, the incidence of radiation on the circuit region 33 can be more reliably suppressed. Specifically, since the second portion 62 and the scintillator layer 8 face the circuit region 33, the incidence of radiation on the circuit region 33 can be reliably suppressed by the second portion 62 and the scintillator layer 8. Further, since the second portion 63 and the scintillator layer 8 face the circuit region 34, the incidence of radiation on the circuit region 34 can be reliably suppressed by the second portion 63 and the scintillator layer 8. Furthermore, since the scintillator layer 8 is integrally formed across the surface 61a, the surface 62a, and the surface 63a, the scintillator layer 8 originally used as a light emitting layer in the radiation detection device 1 can also be used as a layer to suppress the incidence of radiation.

Further, in the radiation detection device 1, the metal layer 9 provided on the scintillator layer 8 is integrally formed across the surface 61a of the first portion 61, the surface 62a of the second portion 62, and the surface 63a of the second portion 63. Accordingly, the incidence of radiation on each of the circuit regions 33 and 34 can be more reliably suppressed. Specifically, since the second portion 62, the scintillator layer 8, and the metal layer 9 face the circuit region 33, the incidence of radiation on the circuit region 33 can be reliably suppressed by the second portion 62, the scintillator layer 8, and the metal layer 9. Further, since the second portion 63, the scintillator layer 8, and the metal layer 9 face the circuit region 34, the incidence of radiation on the circuit region 34 can be reliably suppressed by the second portion 63, the scintillator layer 8, and the metal layer 9. Furthermore, since the metal layer 9 is integrally formed across the surface 61a, the surface 62a, and the surface 63a, the metal layer 9 originally used as a light reflecting layer in the radiation detection device 1 can also be used as a layer to suppress the incidence of radiation.

MODIFICATION EXAMPLES

The present disclosure is not limited to the above-described embodiment. For example, the second portion 62 only has to face the circuit region 33 while separated from the light receiving sensor 3, and the second portion 63 only has to face the circuit region 34 while separated from the light receiving sensor 3. As an example, in the radiation detection device 1 shown in FIG. 3, the surface 62b of the second portion 62 is formed to be inclined such that the surface 62b is closer to the first portion 61 as the surface 62b is closer to the light receiving sensor 3 side when seen in the Y-axis direction. Further, the FOP 6 may have a portion other than the first portion 61 and the plurality of second portions 62 and 63. As an example, in the radiation detection device 1 shown in FIG. 4, the FOP 6 has a third portion 64 in addition to the first portion 61 and the plurality of second portions 62 and 63. The third portion 64 faces the circuit board 2 outside the second portion 62 and is fixed to the circuit board 2. The third portion 64 is integrally formed with the first portion 61 and the plurality of second portions 62 and 63.

Figure 5:
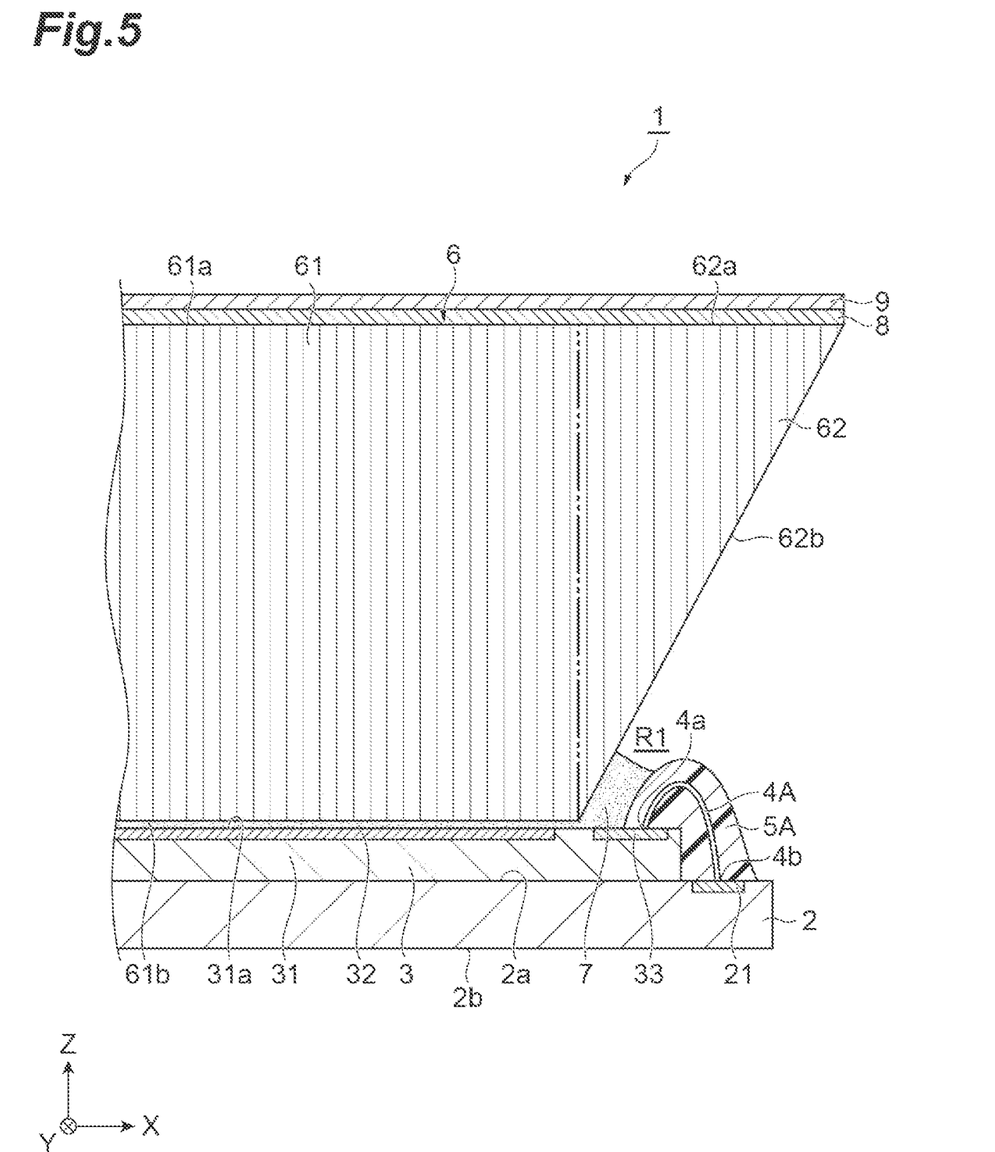
FIG. 5 is a cross-sectional view of a radiation detection device of a modification example.

Further, in the above-described embodiment, the region R1 is defined by the surface 31a of the light receiving sensor 3 on the second portion 62 side, the surface 62b of the second portion 62 on the light receiving sensor 3 side, and the side surface 61c of the first portion 61. Further, in the above-described embodiment, the region R2 is defined by the surface 31a, the surface 63b of the second portion 63 on the light receiving sensor 3 side, and the side surface 61d of the first portion 61. However, the region R1 may not be defined by the side surface 61c of the first portion. Further, the region R2 may not be defined by the side surface 61d of the first portion. As an example, in the radiation detection device 1 shown in FIG. 5, the second portion 62 is formed to cover the entire side portion of the first portion 61 on the second portion 62 side. When seen in the Y-axis direction, the surface 62b of the second portion 62 is inclined to be closer to the first portion 61 as the surface 62b is closer to the light receiving sensor 3 side, and an end of the surface 62b on the light receiving sensor 3 side is connected to the surface 61b of the first portion 61. That is, the region R1 is defined only by the surface 31a of the light receiving sensor 3 on the second portion 62 side and the surface 62b of the second portion 62 on the light receiving sensor 3 side. The above-described examples shown in FIGS. 3 to 5 may be applied to the second portion 63 side.

Further, an aspect of fixing the first portion 61 to the light receiving sensor 3 is not limited to the above-described embodiment. For example, the first portion 61 may be fixed to the light receiving sensor 3 via a light transmitting member provided between the light receiving sensor 3 and the FOP 6. Further, for example, the first portion 61 may be fixed to the light receiving sensor 3 via a fixing member. As an example, the fixing member has a rectangular frame shape surrounding the FOP 6 when seen in the Z-axis direction and is fixed on the circuit board 2. The fixing member fixes the FOP 6 in a state in which an inner side surface of the fixing member is in contact with the side surface of the first portion 61, the side surface of the second portion 62, and the side surface of the second portion 63. Accordingly, the first portion 61 is fixed to the light receiving sensor 3 via a fixing member.

Further, the second portion 62 and the second portion 63 may have different shapes from each other. Further, the position and the number of the circuit regions and the second portions may be different from those of the above-described embodiment. As an example, the plurality of circuit regions 33 and 34 may be provided along two adjacent surfaces of the light receiving region 32, and the plurality of second portions 62 and 63 may be formed along two adjacent surfaces of the first portion 61 to face the light receiving region 32. Further, as an example, the radiation detection device 1 may have only one of a combination of the circuit region 33 and the second portion 62 and a combination of the circuit region 34 and the second portion 63. Further, as an example, in the radiation detection device 1, one or a plurality of circuit regions may be provided to surround the light receiving region, and one or a plurality of second portions may be provided to face the circuit region and to surround the first portion.

Further, in the second portion 62, the portion 62c of outer edge of the second portion 62 on the side opposite to the first portion 61 may be located inside the other end 4b of the wire 4A connected to the circuit board 2 when seen in the thickness direction of the circuit board 2. Further, in the second portion 62, the portion 62c may be located inside the portion 3a of outer edge of the light receiving sensor 3 on the side opposite to the first portion 61 with respect to the circuit region 33 when seen in the thickness direction of the circuit board 2. In the second portion 63, the portion 63c of outer edge of the second portion 63 on the side opposite to the first portion 61 may be located inside the other end 4d of the wire 4B connected to the circuit board 2 when seen in the thickness direction of the circuit board 2. Further, in the second portion 63, the portion 63c may be located inside the portion 3b of outer edge of the light receiving sensor 3 on the side opposite to the first portion 61 with respect to the circuit region 34 when seen in the thickness direction of the circuit board 2.

Further, each optical fiber 6A may be inclined with respect to the thickness direction of the circuit board 2. Further, the adhesive member 7 may not protrude into the region R1 and the region R2. Further, the radiation detection device 1 may not include the protective members 5A and 5B, and the radiation detection device 1 may not include the adhesive member 7.

Further, the surface 61a of the first portion 61, the surface 62a of the second portion 62, and the surface 63a of the second portion 63 may not be located on the same plane. Further, the scintillator layer 8 may not be integrally formed across the surface 61a, the surface 62a, and the surface 63a. Further, in the radiation detection device 1, the scintillator layer 8 may not be provided on the surface 62a of the second portion 62.

Further, the metal layer 9 may not be integrally formed across the surface 61a, the surface 62a, and the surface 63a. Further, in the radiation detection device 1, the metal layer 9 may not be provided on the surface 62a of the second portion 62, and the radiation detection device 1 may not include the metal layer 9.

Further, the light receiving sensor 3 may be a photodiode array chip constituted by a photodiode array. Further, in the radiation detection device 1, the light receiving region 32 may be constituted by pixels arranged in a one-dimensional shape.

A radiation detection device according to an aspect of the present disclosure includes a circuit board; a light receiving sensor provided on the circuit board and having a light receiving region and a circuit region; a fiber optic plate provided on the light receiving sensor; a scintillator layer provided on the fiber optic plate; and a wire laid across the circuit region and the circuit board, wherein the fiber optic plate includes a first portion facing the light receiving region and fixed to the light receiving sensor, and a second portion facing the circuit region while separated from the light receiving sensor, second portion integrally formed with the first portion, and wherein one end of the wire is connected to the circuit region in a region between the light receiving sensor and the second portion.

In this radiation detection device, the second portion of the fiber optic plate faces the circuit region of the light receiving sensor while separated from the light receiving sensor, and in a region between the light receiving sensor and the second portion, the one end of the wire is connected to the circuit region. Accordingly, it is possible to suppress the incidence of radiation on the circuit region while sufficiently securing the region in which the one end of the wire is connected to the circuit region. In particular, since the second portion is integrally formed with the first portion, a situation in which radiation is incident on the circuit region via a space between the first portion and the second portion is prevented. Therefore, according to this radiation detection device, it is possible to suppress the deterioration of the light receiving sensor due to the incidence of radiation on the circuit region.

In the radiation detection device according to the aspect of the present disclosure, when seen in a thickness direction of the circuit board, a portion of outer edge of the second portion on a side opposite to the first portion may be located outside a portion of outer edge of the light receiving sensor on a side opposite to the first portion with respect to the circuit region. Accordingly, even if a position of the fiber optic plate with respect to the light receiving sensor slightly deviates, when seen in the thickness direction of the circuit board, a state in which the second portion includes the circuit region is easily maintained, and thus it is possible to reliably suppress the incidence of radiation on the circuit region.

In the radiation detection device according to the aspect of the present disclosure, when seen in the thickness direction of the circuit board, the portion of the outer edge of the second portion on the side opposite to the first portion may be located outside the other end of the wire connected to the circuit board. Accordingly, in the thickness direction of the circuit board, the second portion covers the wire, and thus damage to the wire can be prevented.

The radiation detection device according to the aspect of the present disclosure may further include a protective member covering the wire. In the protective member, the incidence of radiation is blocked by the second portion, and thus the deterioration is suppressed. Therefore, damage to the wire can be more reliably prevented.

In the radiation detection device according to the aspect of the present disclosure, the region between the light receiving sensor and the second portion may be defined by a surface of the light receiving sensor on the second portion side, a surface of the second portion on the light receiving sensor side, and a side surface of the first portion. Accordingly, it is possible to sufficiently secure the region in which the one end of the wire is connected to the circuit region, and it is possible to easily secure a portion of the second portion in which the incidence of radiation on the circuit region can be reliably suppressed.

In the radiation detection device according to the aspect of the present disclosure, the fiber optic plate includes a plurality of optical fibers, and an optical axis of each of the plurality of optical fibers may extend in the thickness direction of the circuit board. Accordingly, the size of the fiber optic plate can be reduced.

The radiation detection device according to the aspect of the present disclosure may further include an adhesive member disposed between the light receiving sensor and the first portion, wherein the adhesive member may protrude into the region between the light receiving sensor and the second portion. Accordingly, the adhesive strength between the fiber optic plate and the light receiving sensor can be improved.

In the radiation detection device according to the aspect of the present disclosure, a surface of the first portion on a side opposite to the light receiving sensor and a surface of the second portion on a side opposite to the light receiving sensor may be located on the same plane, and the scintillator layer may be integrally formed across the surface of the first portion on the side opposite to the light receiving sensor and the surface of the second portion on the side opposite to the light receiving sensor. Accordingly, the incidence of radiation on the circuit region can be more reliably suppressed.

The radiation detection device according to the aspect of the present disclosure may further include a metal layer provided on the scintillator layer, wherein the metal layer may be integrally formed across the surface of the first portion on the side opposite to the light receiving sensor and the surface of the second portion on the side opposite to the light receiving sensor. Accordingly, the incidence of radiation on the circuit region can be more reliably suppressed.

According to the present disclosure, it is possible to provide a radiation detection device capable of suppressing the deterioration of a light receiving sensor due to the incidence of radiation on a circuit region.

What is claimed is:

1. A radiation detection device comprising:
    a circuit board;
    a light receiving sensor provided on the circuit board and having a light receiving region and a circuit region;
    a fiber optic plate provided on the light receiving sensor;
    a scintillator layer provided on the fiber optic plate; and
    a plurality of wires laid across the circuit region and the circuit board,
    wherein the fiber optic plate includes
    a first portion facing the light receiving region and fixed to the light receiving sensor, and
    a second portion facing the circuit region while separated from the light receiving sensor,
    the first portion includes a first surface and a second surface opposing each other in a thickness direction of the circuit board, the first surface being a light incident surface on a side opposite to the light receiving sensor, and the second surface being a light emitting surface on the light receiving sensor side,
    one end of each of the plurality of wires is connected to the circuit region in a region between the light receiving sensor and the second portion,
    other end of each of the plurality of wires is connected to the circuit board,
    when seen in the thickness direction of the circuit board, in all of the plurality of wires, the other end of each of the plurality of wires is located inside an outer edge of the fiber optic plate,
    a distance between an end portion of the light receiving sensor and the second portion in the thickness direction of the circuit board is greater than a thickness of the light receiving sensor,
    the distance between the first surface and the second surface is greater than a thickness of the scintillator layer,
    the first portion includes a plurality of first optical fibers, the second portion includes a plurality of second optical fibers, and a direction in which each of the plurality of second optical fibers extends is parallel to a direction in which each of the plurality of first optical fibers extends, and at least a part of a surface of the second portion on the light receiving sensor side faces the plurality of wires while separated from the light receiving sensor, the surface including emission ends of the plurality of second optical fibers.

2. The radiation detection device according to claim 1, wherein, when seen in the thickness direction of the circuit board, a portion of an outer edge of the second portion on a side opposite to the first portion is located outside a portion of an outer edge of the light receiving sensor on a side opposite to the first portion with respect to the circuit region.

3. The radiation detection device according to claim 1, further comprising a protective member covering the plurality of wires.

4. The radiation detection device according to claim 1, wherein the region between the light receiving sensor and the second portion is defined by a surface of the light receiving sensor on the second portion side, a surface of the second portion on the light receiving sensor side, and a side surface of the first portion.

5. The radiation detection device according to claim 4, wherein an optical axis of each of the plurality of first and second optical fibers extends in the thickness direction of the circuit board.

6. The radiation detection device according to claim 1, further comprising an adhesive member disposed between the light receiving sensor and the first portion, wherein the adhesive member protrudes into the region between the light receiving sensor and the second portion.

7. The radiation detection device according to claim 1, wherein a surface of the first portion on a side opposite to the light receiving sensor and a surface of the second portion on a side opposite to the light receiving sensor are located on the same plane, and
wherein the scintillator layer is integrally formed across the surface of the first portion on the side opposite to the light receiving sensor and the surface of the second portion on the side opposite to the light receiving sensor.

8. The radiation detection device according to claim 7, further comprising a metal layer provided on the scintillator layer,
wherein the metal layer is integrally formed across the surface of the first portion on the side opposite to the light receiving sensor and the surface of the second portion on the side opposite to the light receiving sensor.

9. The radiation detection device according to claim 1, wherein the circuit board has a plate shape.

10. The radiation detection device according to claim 1, wherein a length of each of the plurality of wires is longer than a distance between the one end of each of the plurality of wires and a side surface of the first portion.

11. The radiation detection device according to claim 1, wherein the second portion is integrally formed with the first portion.

12. The radiation detection device according to claim 1, wherein the plurality of wires is disposed in regions on both sides of the first portion when seen in the thickness direction of the circuit board.

13. The radiation detection device according to claim 1, wherein the plurality of wires is all of a plurality of wires laid across the circuit region and the circuit board.

\* \* \* \* \*